Nov. 7, 1939.  L. E. LUBBERS  2,178,841
AUXILIARY POWER DRIVE
Filed July 9, 1937   2 Sheets-Sheet 1
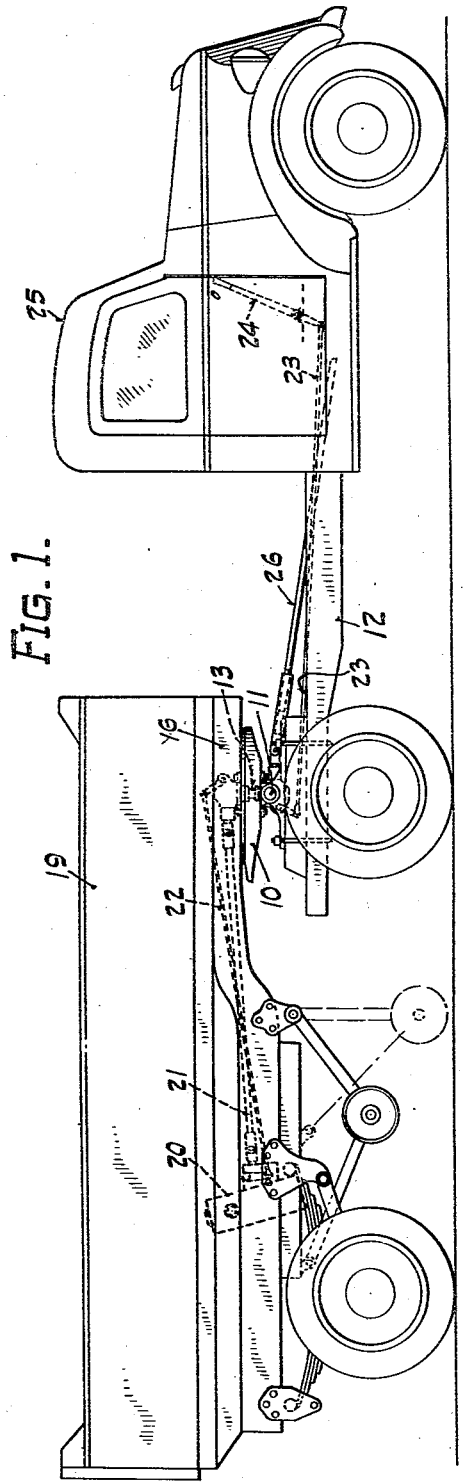
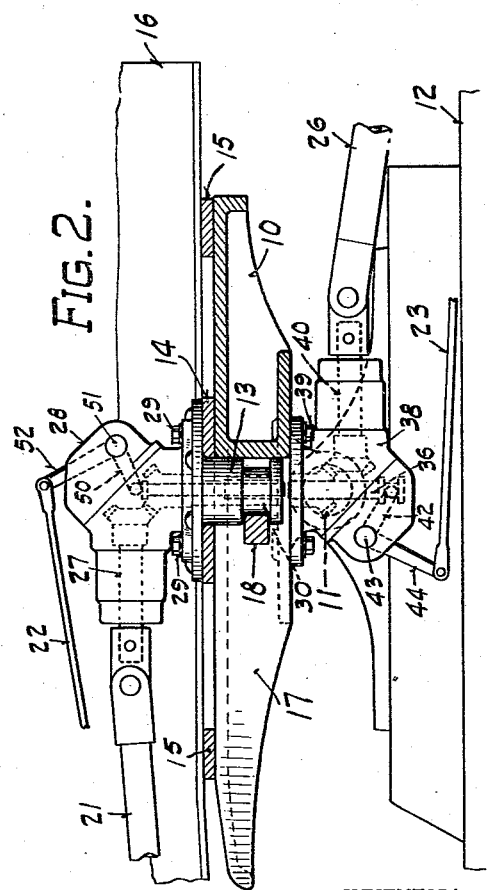
INVENTOR:
Lubbert E. Lubbers
BY
ATTORNEY.

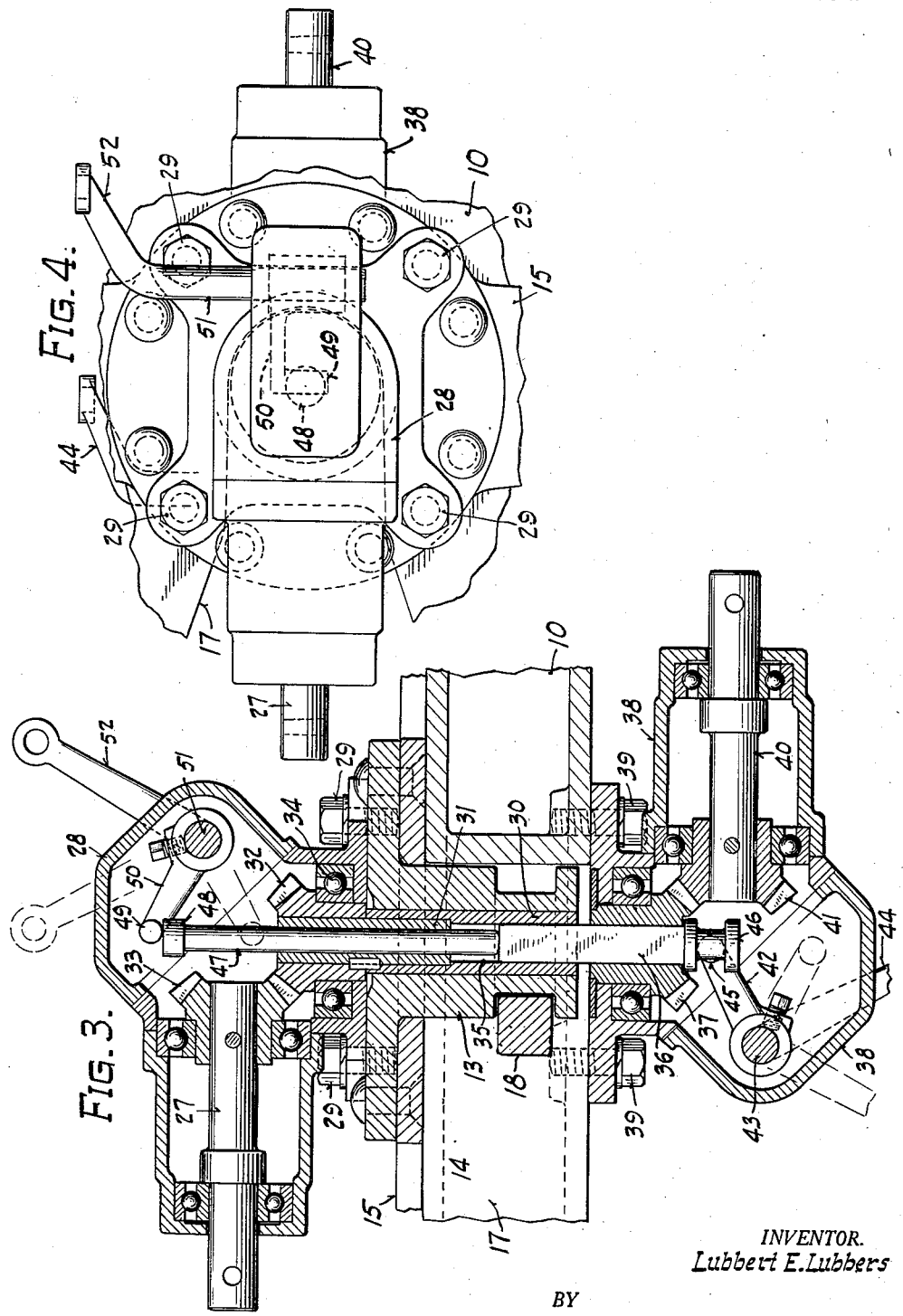

Patented Nov. 7, 1939

2,178,841

UNITED STATES PATENT OFFICE 2,178,841

AUXILIARY POWER DRIVE

Lubbert E. Lubbers, Milwaukee, Wis., assignor of one-half to Alfred A. Lienemann, Milwaukee, Wis.

Application July 9, 1937, Serial No. 152,743

7 Claims. (Cl. 180—14)

This invention relates to auxiliary power drives for semi-trailers and the like.

Truck - drawn semi - trailers are commonly equipped with auxiliary devices, such for instance as body hoist mechanisms, ordinarily actuated by power derived from the truck motor through connections flexible to accommodate relative angular movements between truck and trailer and to be effective in all angular positions thereof. Such connections are ordinarily subjected to severe wear during normal travel of the articulated vehicles, and are ordinarily so exposed as to require great care to avoid serious damage thereto during coupling and uncoupling of the vehicles.

One object of the present invention is to improve the construction and operation of power transmitting connections for the purpose above described.

Another object is to provide an improved power transmitting device readily separable to permit uncoupling of the vehicles and so designed as to eliminate possible damage to the parts during coupling or uncoupling of the vehicles.

Another object is to provide an improved power transmitting device in which the parts are free from wear during travel of the vehicles.

Other more specific objects and advantages will appear, expressed or implied, from the following description of an illustrative embodiment of the present invention.

In the accompanying drawings:

Figure 1 is a side elevation of a coupled truck and semi-trailer equipped with an auxiliary drive constructed in accordance with the present invention.

Fig. 2 is a side elevation, partly in section, on a larger scale, of the trailer coupling and associated auxiliary drive parts shown in Fig. 1. In Fig. 2 the drive parts are shown in the inactive positions normally assumed during travel of the vehicles.

Fig. 3 is a sectional view on a still larger scale of the coupling and associated auxiliary drive parts, showing the latter coupled to transmit power from the truck to the trailer.

Fig. 4 is a top plan view of the mechanism shown in Fig. 3.

A conventional truck is shown in Fig. 1, equipped with the usual so-called "fifth wheel" 10 rockably supported, as at 11, upon the rear end of the truck frame 12 in the usual manner. The conventional semi-trailer shown is equipped wth the usual rigid king pin 13, fixed to and depending from the center 14 of a circular wear-plate 15, securely fixed to the bottom of the trailer frame 16 adjacent its forward end. The fifth wheel 10 is provided with the usual rearwardly directed flared opening 17, by which the pin 13 is directed to the center of the wheel, when coupling the trailer to the truck, the pin 13 being releasably locked in that position by a conventional lock member 18.

When thus assembled, the circular wear-plate 15 seats squarely upon the top face of the fifth wheel 10, so that the latter remains parallel thereto, although the plate 15 turns with the trailer and with respect to the wheel 10 about the axis of the pin 13.

The trailer shown is also equipped with a dump body 19, hydraulically actuated by a conventional lift cylinder 20, energized by a conventional pump and controlled by a conventional valve all in a manner well known in the art. In this instance a shaft 21 is provided to drive the pump, and a rod 22 is provided to operate the valve.

Likewise the truck shown is equipped with a control rod 23, conveniently manipulated through a conventional lever 24 in the cab 25 of the truck, and also with a power transmitting shaft 26 connected to the truck motor through a power take-off mechanism of any conventional or approved type.

Provision is made for separably connecting the power shaft 26 in driving relation with the pump drive shaft 21, through mechanism designed to operate through the king pin 13 under control of the rod 23, and also for rendering the valve rod 22 responsive to the control rod 23. This is accomplished in this instance by mechanism best shown in Fig. 3.

This mechanism includes a shaft 27, coupled to the shaft 21, and journalled in a housing 28 securely anchored to the flanged king pin 13 through bolts 29 or otherwise. The king pin 13 is centrally bored to receive and house a vertical sleeve 30 rotatable therein and keyed to a hollow shaft 31 and to a bevel gear 32 which meshes with a bevel gear 33 on the shaft 27. The assembled gear 32, hollow shaft 31, and sleeve 30 are supported by an appropriate bearing 34 within the housing 28.

The lower end of the sleeve 30 has a square opening 35 adapted to receive a square vertical shaft 36 guided for lengthwise movement within a bevel gear 37 journalled in an inverted housing 38. The housing 38 is securely anchored to the bottom of the fifth wheel 10 by bolts 39 or otherwise and supports a shaft 40 journalled therein. A bevel gear 41 fixed to the shaft 40 meshes with the gear 37. The shaft 40 is coupled to the power shaft 26.

The arrangement is such that, when the square shaft 36 is elevated and thereby projected into the sleeve 30, a driving connection is thereby established from the power shaft 26, through the shaft 40, gears 41 and 37, and shaft 36 to the sleeve 30, and thence through the gears 32 and 33 and shaft 27 to the pump drive shaft 21.

Projection and retraction of the shaft 36 is effected in this instance by an arm 42 fixed to a rock shaft 43 journalled in the housing 38 and carrying an actuating arm 44 at its outer exposed end. The arm 44 is connected to the control rod 23. The arm 42 is shown having a lug 45 at its free end engaged in a spool shaped element 46 fixed to the shaft 36 through which the shaft is actuated.

The shaft 36 normally assumes the retracted position shown in Fig. 2, in which position it is completely housed and protected by the housing 38, and in which position the parts carried by the trailer are completely separated from the parts carried by the truck, so that they are absolutely free from wear that would normally result from relative movement between trailer and truck during travel of those vehicles. However the shaft 21 on the trailer may be instantly connected to the power shaft 26 on the truck merely by manipulation of the lever 24 to elevate and project the shaft 36 into driving relation with the sleeve 30, those parts being always accurately aligned by the accurately sustained central position of the king pin 13 of the trailer within the fifth wheel 10 of the truck.

As above suggested, provision is also preferably made for effecting automatic actuation of the valve rod 22, to open the control valve of the lift cylinder 29 whenever the control rod 23 is actuated to connect the power shaft 26 with the pump shaft 21. In the device shown a push rod 47 is provided for this purpose, the rod 47 being guided for vertical movement within the hollow shaft 31 and disposed to be elevated by upward projection of the shaft 36 into the sleeve 30. A head 48 on the rod 47 limits the downward movement thereof so as to avoid projection thereof beyond the lower end of the king pin 13 when the shaft 36 is in its normal retracted position of Fig. 2.

The upper end or head 48 of the rod 47 coacts with a lug 49 on the end of an arm 50, so as to actuate the latter when the shaft 36 is projected upwardly. The arm 50 is fixed to a rock shaft 51, journalled in the housing 28, and carrying an arm 52 which is connected to the valve rod 22. The arrangement is such that when the shaft 36 is projected upwardly into driving engagement with the sleeve 30, by actuation of the control rod 23, the rod 47 is forced upwardly to actuate the valve rod 22 through the arms 50 and 52.

Various changes may be made in the embodiment of the invention hereinabove specifically described without departing from or sacrificing the advantages of the invention as defined in the appended claims.

I claim:

1. The combination with a motorized vehicle having a rockable fifth wheel, and a drawn vehicle having a coacting hollow king pin engageable in vehicle-coupling arrangement with said fifth wheel by relative horizontal movement therebetween, of a power transmitting gear carried by said drawn vehicle and concentrically disposed with respect to said king pin, an element connected to said gear and rotatable in said king pin, a second power transmitting gear carried and concentrically disposed with respect to said fifth wheel, and means rotatable with said second gear and axially movable relative thereto into driving engagement with said element to effect a separable power transmitting connection between said gears.

2. The combination of a motorized vehicle having a power transmitting drive shaft, a drawn vehicle having a power transmitting driven shaft, driven means on said drawn vehicle to be energized by said last named shaft, coupling means for separably connecting said vehicles, means including a member moveable axially of said coupling means for releasably effecting a driving connection between said shafts, means carried by said motorized vehicle for controlling said member, and a control element for said driven means moveable in response to movement of said member.

3. The combination of a motorized vehicle, a drawn vehicle, coupling means therefore including a substantially vertical king pin on one of said vehicles and a cooperating socket member on the other of said vehicles, said member being constructed to permit entry and withdrawal of said king pin into and out of coupling relation therewith by relative horizontal movement therebetween, driving and driven mechanisms on said vehicles including a rotary element disposed concentrically of said king pin, and means shiftable relative to both said king pin and member to make or break a driving connection between said mechanisms while said vehicles are coupled.

4. The combination of a motorized vehicle, a drawn vehicle, coupling means therefor including a substantially vertical king pin and cooperating socket member on said vehicles respectively, said member being constructed to permit entry and withdrawal of said king pin into and out of coupling relation therewith by relative horizontal movement therebetween, and driving and driven mechanisms on said vehicles respectively, one of said mechanisms including a rotary element moveable relative to and axially of said king pin and member into and out of driving relation with the other of said mechanisms.

5. In a tractor-trailer train having a motorized vehicle, a drawn vehicle, and coupling means releasably connecting said vehicles for relative swinging movement, the combination of a rotary driving member on one of said vehicles, a rotary driven member on the other of said vehicles positioned by said coupling means coaxially of said driving member, an element rotatable with one of said members and movable axially thereof into driving engagement with the other of said members to establish a rotary driving connection therebetween, said element being retractable to completely disengage said members, actuating means on one of said vehicles for producing said axial movement of said element, and additional means on the other of said vehicles actuated by axial movement of said element.

6. In a tractor-trailer train having a motorized vehicle, a drawn vehicle, and coupling means releasably connecting said vehicles for relative swinging movement about an axis, the combination of a rotary member on one of said vehicles disposed concentrically of said axis, a rotary member on the other of said vehicles disposed concentrically of said axis and engaged in driving relation with said first named member, the member on one of said vehicles being also axially movable relative to the member on the other of said vehicles, and mechanism on said last named vehicle operable by axial movement of said member.

7. In a tractor-trailer train having a motorized vehicle, a drawn vehicle, and a king pin forming a swivel connection between said vehicles, driven means on said drawn vehicle, and controls therefor, the combination of a member within said king pin movable relative thereto, means on said drawn vehicle coacting with said member to transmit power therefrom to said driven mechanism, a second member within said king pin moveable relatively thereto independently of said first named member, means on said drawn vehicle coacting with said second member to transmit motion therefrom to said controls, and means on said motorized vehicle for operating both of said members.

LUBBERT E. LUBBERS.